United States Patent
Tettington

(10) Patent No.: US 6,295,065 B1
(45) Date of Patent: Sep. 25, 2001

(54) METHOD AND APPARATUS TO ALTERNATE STEREOSCOPIC IMAGES IN A VIDEO DISPLAY DEVICE

(75) Inventor: Kenneth J. Tettington, Edmonton (CA)

(73) Assignee: Tetratel Systems Limited, Edmonton (CA)

( * ) Notice: Subject to any disclaimer, the term of this patent is extended or adjusted under 35 U.S.C. 154(b) by 0 days.

(21) Appl. No.: 09/130,938

(22) Filed: Aug. 7, 1998

Related U.S. Application Data

(60) Provisional application No. 60/054,933, filed on Aug. 8, 1997.

(51) Int. Cl.$^7$ .................................................. G06F 15/00
(52) U.S. Cl. ............................................................ 345/419
(58) Field of Search ..................................... 345/419, 420, 345/421, 422, 433, 435

(56) References Cited

U.S. PATENT DOCUMENTS

| | | | |
|---|---|---|---|
| 5,821,989 | 10/1998 | Lazzaro et al. | 348/56 |
| 6,011,581 * | 1/2000 | Swift et al. | 345/419 |
| 6,023,276 * | 2/2000 | Kawai et al. | 345/419 |
| 6,031,564 * | 2/2000 | Ma et al. | 345/419 |

* cited by examiner

Primary Examiner—Phu K. Nguyen
(74) Attorney, Agent, or Firm—Bennett Jones LLP

(57) ABSTRACT

A method for displaying a stereoscopic image on a computer monitor includes the use of a composite stereoscopic image where one of the left or right eye images is displayed on every odd-numbered horizontal scan line while the other image is displayed on every even-numbered horizontal scan line. In a first vertical scan, the odd-numbered horizontal scan lines are cancelled so that only the image displayed by the even-numbered lines visible. In a second vertical scan, the even-numbered horizontal scan lines are cancelled so that only the image displayed by the odd-numbered horizontal scan lines is visible. The first and second image states are alternately displayed with every vertical refresh cycle. LCD glasses which alternately block the left eye or the right eye are synchronized to the alternation of the first and second image states, such that the left eye sees only the left eye image and the right eye sees only the right eye image, resulting in the user perceiving a stereoscopic image. The invention also relates to an apparatus for causing a computer monitor to display only odd-numbered horizontal scan lines during a first image state and only even-numbered horizontal scan lines during a second image state, such that the first and second image states alternate with every vertical refresh cycles. The apparatus includes means for synchronizing the alternation of the first and second image states with LCD glasses which selectively block the left eye or right eye vision of a user.

6 Claims, 4 Drawing Sheets

METHOD AND APPARATUS TO ALTERNATE STEREOSCOPIC IMAGES IN A VIDEO DISPLAY DEVICE

The provisional application 60/056,933 filed Aug. 8, 1997.

FIELD OF INVENTION

The present invention relates to stereoscopic video display systems and in particular to a method and apparatus to alternate stereoscopic images in a video display device.

BACKGROUND OF THE INVENTION

Stereoscopic or three-dimensional vision may be produced on a two-dimensional medium by creating a pair of stereoscopic images; a left eye image and a right eye image. If a viewer sees only the left eye image with the left eye and the right eye image with the right eye, the viewer perceives a three-dimensional image from the two stereoscopic images.

Conventional video display devices such as computer monitors produce an image by rapidly creating a plurality of horizontal display lines stacked in a vertical frame. Once the horizontal display lines reaches the bottom of the vertical frame, the image is refreshed by recommencing the horizontal display lines from the top.

Currently, it is known to produce stereoscopic vision on a display device using a technique whereby the left eye image is held in one memory buffer and the right eye image is held in another memory buffer. The right and left eye images are rapidly alternated on the display device while liquid crystal display or LCD glasses, synchronized to the alternating pattern, restrict the viewers eyes to only seeing the corresponding right or left image as it is presented on the display device.

However, such stereoscopic systems suffer from certain disadvantages. Current stereoscopic systems are restricted by processor speed as to how fast it can synchronize the LCD glasses and alternate the left and right eye images on the display device. Such systems require more video display card memory, to contain right and left eye images, than is available on standard video display cards. Current standards for video display cards contain 1,000,000 bytes of memory while stereoscopic systems require 1,843,200 bytes of memory to display 640×480 full resolution color images. This restricts stereoscopic systems to low resolution images.

Current stereoscopic systems are also restricted by a video display card's speed as to how fast it can transfer the left and right eye images to the video display device.

Current stereoscopic systems are dependent on the type of host's video display card memory capacity, the speed at which the video display card can alternate images and the speed at which the processor can control the stereoscopic system, thus restricting the use of stereoscopic vision to specific hardware configurations.

Therefore, there is a need in the art for an improved stereoscopic display system which overcomes the disadvantages of the prior art.

SUMMARY OF THE INVENTION

In general terms, in one aspect of the present invention, there is provided an apparatus to create a stereoscopic display on a display device. The apparatus connects between a video card and a video display and operates by causing the display to rapidly alternate left eye and right eye stereoscopic images with every vertical refresh cycle. The apparatus cancels every other horizontal display line during a first vertical refresh cycle and then cancels the other horizontal display lines during the next vertical refresh cycle. The apparatus is used in synchronized combination with LCD glasses worn by the user which blocks the view in the left eye and the right eye alternately. The image generated by the video card and manipulated by the apparatus is a composite image, comprising a mixture of two stereoscopic images wherein one image is defined by the odd numbered horizontal display lines (every other horizontal display line commencing with the first such line) and the other is defined by the even numbered horizontal display lines (every other horizontal display line commencing with the second such line). The generation of such a composite image from two stereoscopic images is well-known in the art.

The apparatus comprises a switching circuit for use with a computer system generating a periodic vertical retrace signal, wherein each vertical retrace signal coincides with the start of a vertical refresh cycle comprising a plurality of horizontal display lines, a periodic horizontal retrace signal, wherein each horizontal retrace signal coincides with the start of a horizontal line, and at least one color signal, said switching circuit comprising:

a) means to detect the vertical retrace signal;

b) means to detect the horizontal retrace signal;

c) means connected to the horizontal retrace signal detection means for generating a squarewave signal having a period twice the period of the horizontal retrace signal; and d) means for generating a blanking pulse which cancels the at least one color signal; and e) means for synchronizing the blanking pulse with the squarewave signal such that every odd-numbered horizontal display line is blanked during a first image state and every even-numbered horizontal display line is blanked during a second image state;

f) wherein said synchronization means is connected to the vertical retrace detection means, the horizontal retrace signal detection means, the squarewave generation means and the blanking pulse generation means; and g) means connected to the vertical retrace signal detection means and the synchronization means for switching between the first and second image states between successive vertical refresh cycles;

In its preferred embodiment, the switching circuit is combined with a voltage regulation circuit and a operating mode selection circuit. The combined circuitry is mounted to a circuit board which interconnects between a video card and a display device and has a manually operable power switch and a manually operable mode selection switch.

In general terns and in another aspect of the invention, there is provided a method of displaying a stereoscopic display on a display device. The method comprises the steps of:

a) providing a computer system which causes a display screen to display an image comprising a plurality of horizontal display lines, wherein a set of horizontal display lines is completed in a vertical refresh cycle;

b) providing a composite image represented by a plurality of horizontal display lines comprising first and second stereoscopic images wherein the first stereoscopic image is represented by the odd numbered horizontal lines (every other horizontal line commencing with the first such line) and the second stereoscopic image is represented by the even numbered horizontal lines (every other horizontal line commencing with the second such line);

c) providing an apparatus which cancels the second image during a first vertical refresh cycle and which cancels the first image during a second vertical refresh cycle; and d) rapidly switching between the first and second vertical refresh cycles.

BRIEF DESCRIPTION OF DRAWINGS

The invention will now be described by way of an exemplary embodiment with reference to the following drawings, in which.

DETAILED DESCRIPTION OF THE PREFERRED EMBODIMENT

The invention is an apparatus (10) to cause a display device (35) to alternately display only odd-numbered horizontal scan lines by cancelling the even-numbered horizontal scan lines, and to display only even-numbered horizontal scan lines by cancelling the odd-numbered horizontal scan lines. The frequency of alternation is matched to the vertical refresh cycle of the display device.

Figure 1:
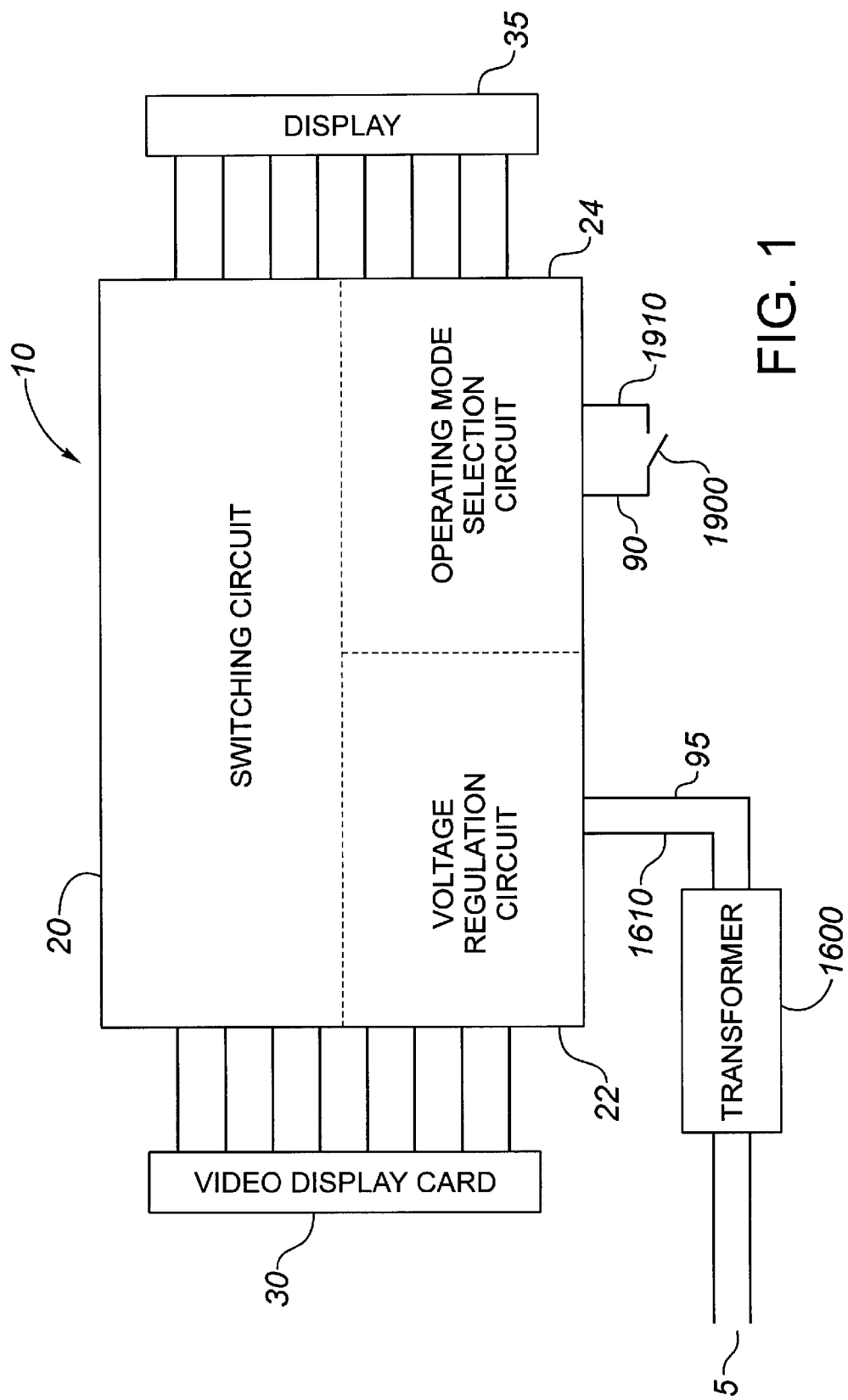
FIG. 1 is a schematic depiction of a display system including the apparatus of the preferred embodiment.

As shown in FIG. 1, the preferred embodiment of apparatus (10) comprises a switching circuit generally identified by reference (20), a voltage regulation circuit generally identified by reference (22) and an operating mode selection circuit generally identified by reference (24). The apparatus (10) in one preferred embodiment is an electronic circuit constructed on a circuit board and enclosed in a casing (not shown) as is well-known in the art. There is provided a manually operable power switch (not shown) and a manually operable operating mode selection switch (1900).

Signals required by circuit (20) are obtained from video display card (30) which provides the signals required by display (35). Generally, video display card (30) is connected to display (35) by means of a multiconductor cable although other methods and mechanisms may perform the same function. In the preferred embodiment, a first multiconductor cable (36) from display (35) is connected to apparatus (10) and a second multiconductor cable (37) is connected from apparatus (10) to video display card (30).

Power for apparatus (10) is provided to circuit (22) by a transformer (1600) which converts alternating current (5) to direct current (1610) and is returned by a ground (95). In the preferred embodiment, transformer (1600) is an alternating current transformer which reduces normal household power to a level acceptable by apparatus (10). It will be apparent to one skilled in the art that other power sources can be used in place of a transformer (1600). Power for apparatus (10) can be supplied from a battery, from the host video display (35), the video display card (30) or from the host processor system.

Control of the operating states of apparatus (10) is performed by a momentary contact electrical switch (1900) connected to a power lead (90) and passing the state of the switch (1900) to the operating mode selection circuit (24) by connector (1910). The momentary contact electrical switch (1900) is preferred, however other mechanisms are well known which may perform the same function. For example, the switch (1900) may also be replaced by an automatic sensing circuit as is well known in the art.

Apparatus (10) has a switching circuit generally identified by reference (20). The use and operation of the switching circuit (20) will now be described with reference to FIG. 2.

In order to simplify fabrication of switching circuit (20), eight commercially available devices, chips (100), (200), (300), (400), (500), (600), (700) and (800) are used in the preferred embodiment. Chip (100) is an Exclusive-OR chip manufactured by Motorola and identified by the manufacturer as MC14070BCP. Chip (200) is a D-Type Flip-Flop chip manufactured by Motorola and identified by the manufacturers MC 14013BCP. Chip (300) is an NAND chip, used as an Inverter and a Delay, manufactured by Motorola and identified by the manufacturer as MC14011BCP. Chip (400) is an Exclusive-OR chip, used as an Inverter, manufactured by Motorola and identified by the manufacturer as MC14070BCP. Chip (500) is an Exclusive-OR chip, used as an Inverter and Delay, manufactured by Motorola and identified by the manufacturer as MC14070BCP. Chip (600) is a D-Type Flip-Flop chip manufactured by Motorola and identified by the manufacturer as MC14013BCP. Chip (700) is an NAND chip, used as an Pulse Enable/Disable element, manufactured by Motorola and identified by the manufacturer as MC14011BCP. Chip (800) is an NAND chip, used as an Inverter and Delay, manufactured by Motorola and identified by the manufacturer as MC14011BCP.

It is preferred that the Motorola MC14070BCP, MC14013BCP and MC14011BCP chips be used. It will be apparent to one skilled in the art that other types of chips may be used to construct switching circuit (20) and that other combinations of the chips may be so arranged to perform the same fiction but in a manner which makes economical use of the chips.

In order to simplify fabrication of switching circuit (20), three commercially available transistors (900), (1000) and (1100) are used as signal shunts. The three transistors are identified as VN0300L types. It is preferred that the VN0300L transistors be used although there are other transistors that could be used. It will be apparent to one skilled in the art that the switching action of transistors (900), (1000) and (1100) may be accomplished by transistors of a Bipolar Junction type or Field Effect type or other solid state devices than those specified above. As well, it will be apparent that all of the return leads may be connected to a common ground rather than as specified in the preferred embodiment and that such a connection may produce the same result.

The switching circuit (20) detects the display card (30) vertical retrace signal (40) being sent to display (35). The vertical retrace signal (40) represents the switching circuit's (20) first input. The vertical retrace signal (40) is connected to capacitor (45) which isolates the direct current leakage path from vertical retrace (40) and the input connection (410) which couples the vertical retrace signal to the input of chip (400). The switching circuit (20) also detects the display card (30) horizontal retrace signal (50) being sent to display (35). The horizontal retrace signal (50) represents the switching circuit's (20) second input.

The horizontal retrace signal (50) is connected to capacitor (55) which isolates the direct current leakage path from the horizontal retrace signal (50) and the input connection (110) which couples the horizontal retrace signal (50) to the input of chip (100). Therefore, chip (100) has as one input the horizontal retrace signal (50) through connection (110). Chip (100) has as another input a pulse signal (810). The chip (100) has an output switching signal means (120) whose state is controlled by horizontal retrace signal (110). The chip (100) output switching signal (120) is also controlled by the pulse signal (810) output from chip (800). The chip (100) is an Exclusive-OR gate whose output switching signal (120) is the same as the input horizontal retrace signal (110) when no signal is present on pulse signal (810). The output switching signal (120) is not the same as the horizontal retrace signal (110) when a signal is present on pulse signal (810).

The chip (200) has as one input a switching signal (120) and has as another input an output state signal (320). The chip (200) has as a third input a control voltage signal (1200). The control voltage signal (1200) is to be described later in reference to FIG. 4. The chip (200) is rendered enabled or disabled by the state of control voltage signal (1200). The chip 200 operates as a D Type Flip-Flop whose non-inverted output sign state (220) is changed when switching signal (120) causes the chip (200) clock input to detect a valid pulse. When the chip (200) clock input detects a valid pulse at switching signal (120) the state of output state signal means (320) is transferred to non-inverted output signal means (220). The chip (200) output signal state means (220) stays constant in the new state until the next time the chip (200) clock input detects a valid pulse at switching signal means (120). The chip (200) state of output signal means (320) is not transferred to non-inverted output signal means (220) if the chip (200) is disabled by of control voltage means (1200).

The chip (300) has as an input signal state means (220). The chip (300) has as an output state signal means (310). The chip (300) is an NAND gate made to operate as an Inverter. The chip (300) provides a time delay used in conjunction with the internal time delay of the chip (200) to provide a useful time delay between the switching signal means (120) and the state of output state signal means (320). The chip (300) output signal means (310) is used to drive color control transistor (900) gate by drive signal means (330). The chip (300) output signal means (310) is also used to drive color control transistor (1000) gate by drive signal means (330). The chip (300) output signal means (310) is additionally used to drive color control transistor (1100) gate by drive signal means (330). The chip (300) output signal means (310) is used to drive output state signal means (320).

Figure 2:
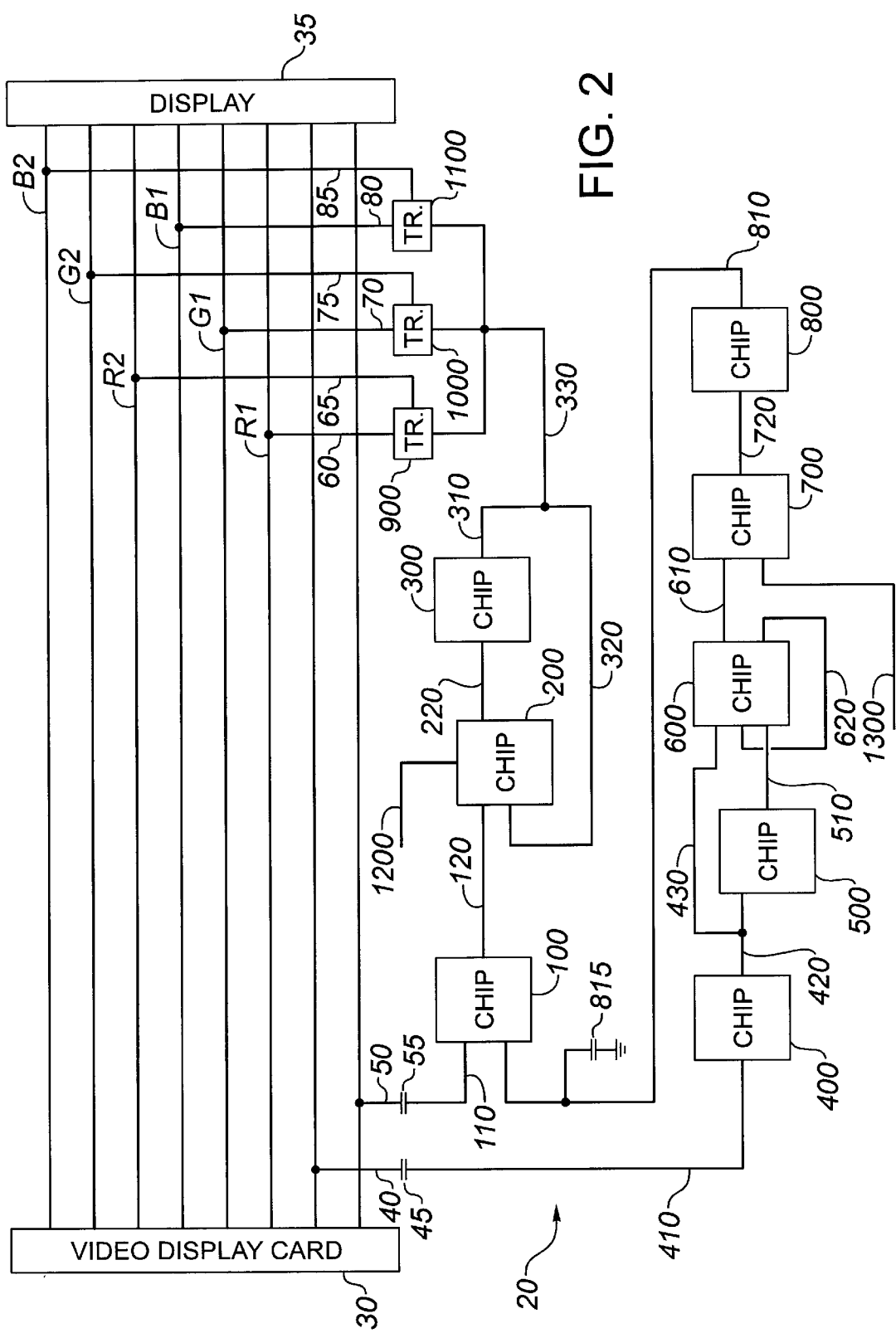
FIG. 2 is a schematic depiction of the switching circuit of the preferred embodiment.

The display card (30) signals are tapped by the switching circuit (20) to allow the switching circuit (20) to control the amplitude of the color signals (R1, R2, G1, G2, B1, B2) generated by display card (30) and sent to display (35). Switching circuit (20) is connected to the red signal (R1), the green signal (G1) and the blue signal (B1) as shown in FIG. 2. Switching circuit is also connected to the red signal return (R2), the green signal return (G2) and the blue signal return (82). Each of the display card (30) color signals represents an input to the switching circuit (20).

Transistor (900) drain is connected to color signal connector (60 and transistor (900) source is connected to connector (65). Transistor (1000) drain is connected to connector (70) and transistor (1000) source is connected to connector (75). Transistor (1100) drain is connected to connector (80) and transistor (100) source is connected to connector (85).

Transistor (900) is an N-channel FET type transistor whose internal resistance is minimum when drive signal (330) applied to transistor (900) gate is a high signal and whose internal resistance is maximum when drive signal (330) applied to transistor (900) gate is a low signal. Transistor (1000) is an N-channel FET type transistor whose internal resistance is minimum when drive signal means (330) applied to transistor (1000) gate is a high signal and whose internal resistance is maximum when drive signal means (330) applied to transistor (1000) gate is a low signal. Transistor (1100) is an N-channel FET type transistor whose internal resistance is minimum when drive signal (330) applied to transistor (1100) gate is a high signal and whose internal resistance is maximum when drive signal (330) applied to transistor (1100) gate is a low signal.

When drive signal (330) applied to transistor (900) gate is a high signal, transistor 900 causes the red signal (R1) to shunt to the red signal return (R2). The red signal (R1) is therefore sufficiently reduced in amplitude to be rendered unusable by display (35). Similarly, when the drive signal (330) applied to transistor (1000) gate is a high signal, transistor (1000) causes the green signal (G1) to shunt to the green signal return (G2). The green signal (G2) is therefore sufficiently reduced in amplitude to be rendered unusable by display (35). When the drive signal (330) applied to transistor (1100) gate is a high signal, transistor (1100) causes the blue signal (B1) to shunt to the blue signal return (B2) thereby sufficiently reducing the blue signal (B1) in amplitude to be rendered unusable by display (35).

In summary, when the drive signal (330) is a high signal, the transistors (900, 1000, 1100) operate to shunt the color signals to their respective color return signal, rendering the color signals unusable by the display (35).

The chip 400 has as an input the vertical retrace signal (410). The chip (400) has as an output the inverted state vertical retrace signal (420). The chip (400) is an Exclusive-OR gate made to operate as an Inverter. The inverted state vertical retrace signal (420) drives the input to the chip (500). The inverted state vertical retrace signal means (420) also drives the input (430) to the chip (600).

The chip (500) has as an input the inverted state vertical retrace signal (420). The chip (500) has as an out put the non-inverted state vertical retrace signal (510). The chip (500) is an Exclusive-OR gate made to operate as an Inverter and as a Delay.

The chip (600) has as an input the inverted state vertical retrace signal (430). The chip (600) has as another input the non-inverted state vertical retrace signal (510). The chip (600) has as an additional input the inverting state signal (620). The chip (600) has as an output the non-inverted state signal (610). The chip (600) has as another output the inverting state signal (620). The chip (600) operates as a D Type Flip-Flop whose non-inverted output signal state (610) and whose inverting state signal output (620) are changed when non-inverted state vertical retrace signal (510) causes the chip (600) clock input to detect a valid pulse. When the chip (600) clock input detects a valid pulse by non-inverted state vertical retrace signal (510) the state of output state signal (620) is transferred to non-inverted output signal state (610). The chip (600) non-inverting output signal state (610) and inverting state signal output (620) stay constant in their new state until the next time the chip (600) clock input detects a valid pulse by non-inverted state vertical retrace signal (510). The chip (600) non-inverting output signal state (610) and inverting state signal output (620) are returned to their original states when the inverted state vertical retrace signal (430) causes the chip (600) reset input to detect a high signal. The chip (600) is made to act as a pulse generation circuit. The pulse is generated to be coexistent with the start of the vertical refresh signal.

The chip (700) has as an input pulse signal (610). The chip (700) has as another input a control voltage (1300). The control voltage (1300) is to be described later in reference to FIG. 4. The chip (700) is rendered Enabled or Disabled by the state of the control voltage (1300). The chip (700) has as an output pulse signal (720). The chip (700) is an NAND gate made to operate as a controlled Pulse Enable or Pulse Disable.

The chip (800) has as an input pulse signal (720). The chip (800) has as an output inverted pulse signal (810). The chip (800) is an NAND made to operate as an Inverter. The combination of the chip (700) NAND Enable/Disable driving the chip (800) NAND Inverter creates an AND gate operation. The capacitor (815) is connected to inverted pulse signal (810) to form a waveshaping circuit. The waveshaping circuit ensures that pulse signal (810) and horizontal retrace signal (110) are properly synchronized to drive the chip (100).

A high signal by control voltage (1300) applied to the chip (700) ensures that pulse signal (720) is passed through the chip (700) and the chip (800) and into the chip (100) by pulse signal (810). The existence of pulse signal (810) and horizontal retrace signal (110) as inputs to the chip (100) cause the output signal (120) to be changed by removal of a horizontal retrace cycle occurring during the time interval of a pulse on pulse signal (810).

For a video mode generated by video card (30) which has an odd number of horizontal retrace cycles per vertical frame, the switching circuit (20) is able to synchronize with every vertical frame by removing the last horizontal retrace cycle in the frame.

A low signal by control voltage (1300) applied to the chip (700) ensures that pulse signal (720) does not pass a pulse through the chip (700) and the chip (800) and into the chip (100) by pulse signal (810). Without a pulse on pulse signal (810), the chip (100) does not modify the horizontal retrace signal (110) and simply outputs it as output signal (120).

For a video mode generated by video card (30) which has an even number of horizontal retrace cycles in total per vertical frame, the switching circuit (20) is able to synchronize with every vertical frame. For a vertical frame with a total even number of horizontal retrace cycles no pulse signal is passed by the chip (700) and no horizontal retrace cycle is removed.

It will be apparent to one skilled in the art that other methods can be used to determine the number of horizontal scan lines visible on the display (35). A series of counters which count the total number of horizontal scan lines (50) during a vertical scan period (40) and reset the horizontal retrace synchronization chip (100) will maintain vertical frame synchronization to cause an outcome identical to the preferred embodiment.

Figure 3:
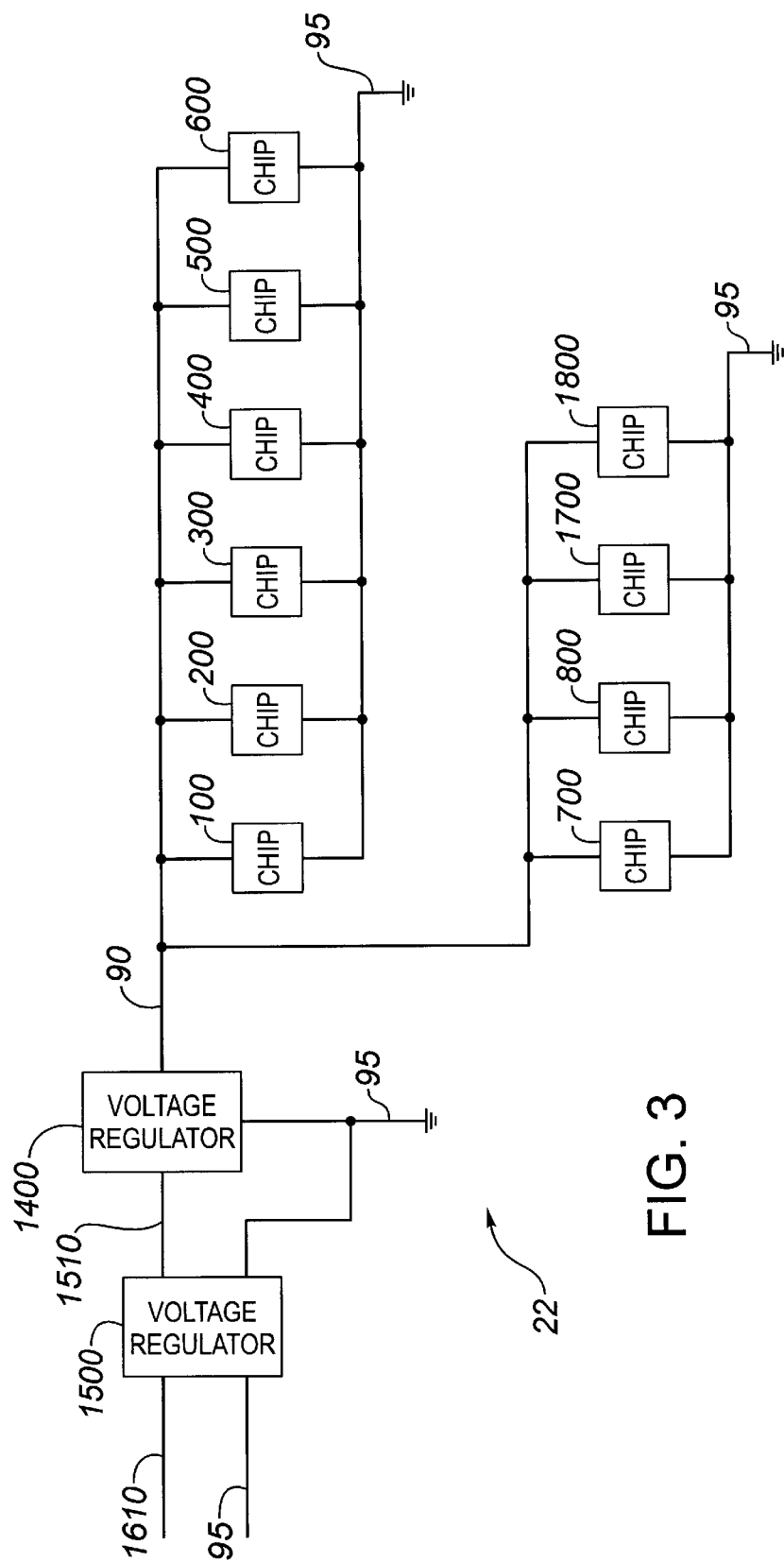
FIG. 3 is a schematic depiction of the voltage regulation circuit of the preferred embodiment.

Apparatus (10) also includes power regulation circuit (22), the use and operation of which will now be described with reference to FIG. 3.

Power is applied from the transformer (1600) to power regulation circuit (22) by power input (1610) and returned by ground (95). Voltage regulator (1500) has as an input the power input (1610) and as an output the power lead (1510). Voltage regulator (1500) also includes a common ground (95) also referred to as the circuit ground for apparatus (10). The power applied to the power input (1610) and power lead (1510) is reduced in voltage and of an unregulated type.

The chip (1400) has as an input power lead (1510), as an output regulated power (90) and a common ground (95). The chip (1400) is a voltage regulation chip. In the preferred embodiment, the chip (1400) is a 78L05 linear voltage regulator manufactured by Motorola. Power (90) is introduced to switching circuit (20) chips (100, 200, 300, 400, 500, 600, 700 and 800). Power (90) is introduced to operating mode selection circuit (24) chips (1700) and (1800). Power (90) represents switching circuit (20) ninth input. Common ground (95) represents the switching circuit's (20) tenth input.

Figure 4:
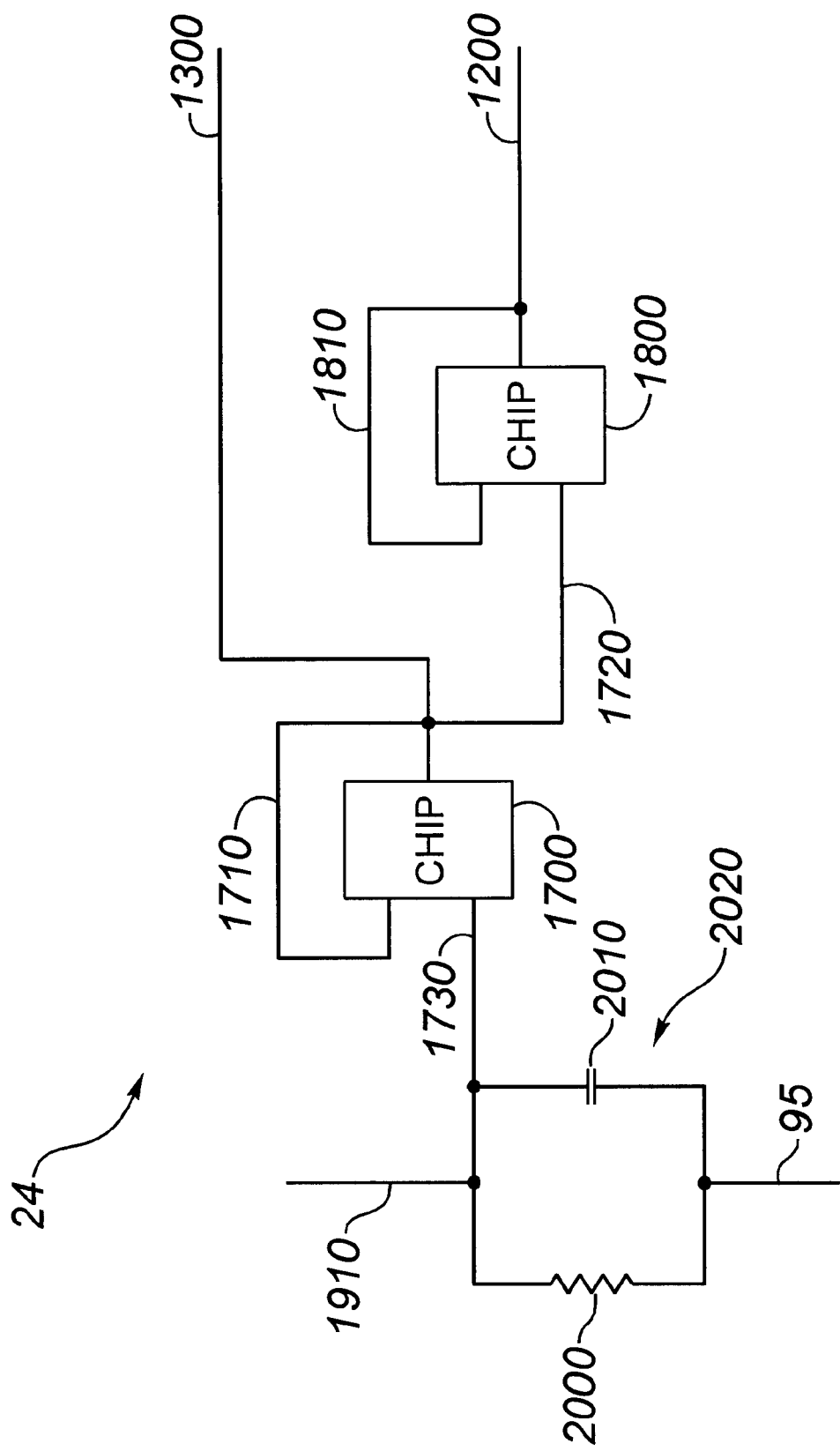
FIG. 4 is a schematic depiction of the operating mode selection circuit of the preferred embodiment.

The use and operation of the operating mode selection circuit (24) will now be described with reference to FIG. 4.

The video display card (30) may cause the display (35) to operate in any of a number of standard modes that is determined solely by the operating software running on the host processor. Such software controls the display card (30), which sets the display (35) video mode. Apparatus (10) provides the ability for a user to adjust operation of switching circuit (20) with operating mode selection circuit (24). Switching circuit (20) would be adjusted to synchronize operation with the video mode generated by display card (35). Operating mode selection circuit (24) represents a best mode of operation although other types of circuits exist to perform a similar function.

The chip (1700) has as an input a momentary voltage transient circuit (2020) connected by connector (1730). Momentary voltage transient circuit (2020) includes resistor (2000) connected in parallel with capacitor (2010). One end of resistor (2000) and capacitor (2010) are connected to common ground (95) and their other ends are connected to momentary voltage transient connector (1910). Resistor (2000) and capacitor (2010) form a time constant network to condition the momentary voltage transient signal carried by connector (1910) and momentary switch (1900) and power (90).

The chip (1700) has as another input inverting output state (1710). The chip (1700) operates as a D Type Flip-Flop whose non-inverted output signal state (1710) is changed when voltage transient signal (1730) causes the chip (1700) clock input to detect a valid pulse. When the chip (1700) clock input detects a valid pulse at voltage transient signal (1730) the state of inverting output state signal (1710) is transferred to data input (1710) of the chip (1700). The chip (1700) inverting output signal (1710) stays constant in the new state until the next time the chip (1700) clock input detects a valid pulse at voltage transient signal (1730). The chip (1700) inverting output signal (1710) also drives the chip (1800) input signal (1720). The chip (1700) inverting output signal (1710) further drives the control voltage (1300).

The chip (1800) has as an input signal (1720). The chip (1800) has as another input inverting output state (1810). The chip (1800) operates as a D Type Flip-Flop whose non-inverted output signal state (1810) is changed when input signal (1720) causes the chip (1800) clock input to detect a valid pulse. When the chip (1800) clock input detects a valid pulse at input signal (1720) the state of inverting output state signal (1810) is transferred to data input (1810) of the chip (1800). The chip (1800) inverting output signal (1810) stays constant in the new state until the next time the chip (1800) clock input detects a valid pulse at input signal (1720). The chip (1800) inverting output signal (1810) further drives the control voltage (1200).

It will be apparent to one skilled in the art that the main principles of operation of switching circuit (20) may be implemented in a microprocessor chip and it is intended that the appended claims cover within their scope such a microprocessor chip. It will be apparent to one skilled in the art that circuit (24) may also be implemented in the same microprocessor.

It will be apparent to one skilled in the art that the main principles of operation of switching circuit (20) may be implemented in an electronically programmable device whose functional code is designed to causes an outcome substantially similar to the preferred embodiment disclosed herein.

Those skilled in the art will readily appreciate that many other modifications can be effected to the arrangement of the present invention without departing from the scope of the present invention.

The embodiments in which an exclusive property or privilege are claimed are as follows:

1. An apparatus for use with a computer system having a non-interlaced display device and generating a periodic vertical retrace signal, wherein each vertical retrace signal coincides with the start of a vertical refresh cycle comprising a plurality of horizontal display lines, a periodic horizontal retrace signal, wherein each horizontal retrace signal coincides with the start of a horizontal line, and at least one color signal, said apparatus comprising:

(a) means to detect the vertical retrace signal;

(b) means to detect the horizontal retrace signal;

(c) means connected to the horizontal retrace signal detection means for generating a squarewave signal having a period twice the period of the horizontal retrace signal;

(d) means for generating a blanking pulse which cancels the at least one color signal;

(e) means for synchronizing the blanking pulse with the squarewave signal such that every odd-numbered horizontal display line is blanked during a first image state and every even-numbered horizontal display line is blanked during a second image state;

(f) wherein said synchronization means is connected to the vertical retrace detection means, the horizontal retrace signal detection means, the squarewave generation means and the blanking pulse generating means; and (g) means connected to the vertical retrace signal detection means and the synchronization means for switching between the first and second image states between successive vertical refresh cycles.

2. The apparatus of claim 1 further comprising a voltage regulation circuit and an operating mode selection circuit.

3. The apparatus of claim 2 wherein the at least one color signal comprises a red color signal, a green color signal and a blue color signal, each of which is cancelled by the blanking pulse.

4. An apparatus for use with a non-interlaced computer monitor and a computer system generating a periodic vertical retrace signal, a periodic horizontal retrace signal and a composite stereoscopic image signal comprising a stereo pair of images drawn by a plurality of horizontal display lines, wherein one stereo image is displayed by the odd-numbered horizontal lines and the other stereo image is displayed by the even-numbered horizontal lines, said apparatus comprising:

(a) a vertical retrace signal input;

(b) a horizontal retrace signal input;

(c) means for determining the frequency of the horizontal retrace signal;

(d) means for generating a blanking pulse for canceling the image signal wherein said blanking pulse is generated at a frequency one-half of the horizontal retrace signal frequency; and (e) means for synchronizing the blanking pulse with the vertical retrace signal and the horizontal retrace signal such that the blanking pulse repeatedly cancels the odd-numbered horizontal lines during one vertical retrace cycle and the even-numbered horizontal lines during the next vertical retrace cycle.

5. A method of displaying a stereoscopic image on a display device driven by a computer system comprising the steps of:

(a) providing a computer system which causes a non-interlaced display screen to display an image comprising a plurality of horizontal display lines, wherein a set of horizontal display lines is completed in a vertical refresh cycle;

(b) providing a composite image represented by a plurality of horizontal display lines comprising first and second stereoscopic images wherein the first stereoscopic image is represented by the odd numbered horizontal lines (every other horizontal line commencing with the first such line) and the second stereoscopic image is represented by the even numbered horizontal lines (every other horizontal line commencing with the second such line);

(c) canceling every even numbered horizontal line thereby canceling the second image during a first vertical refresh cycle and canceling every odd numbered horizontal line thereby canceling the first image during a second vertical refresh cycle; and (d) rapidly switching between the first and second vertical refresh cycles.

6. The method of claim 5 further comprising the step of synchronizing glasses having a left eye shutter and a right eye shutter with the first and second vertical refresh cycles such that one of the left eye or right eye shutters is closed during the first vertical refresh cycle and the other shutter is closed during the second vertical refresh cycle.

* * * * *

UNITED STATES PATENT AND TRADEMARK OFFICE
CERTIFICATE OF CORRECTION

PATENT NO. : 6,295,065 B1
DATED : September 25, 2001
INVENTOR(S) : Kenneth J. Tetterington It is certified that error appears in the above-identified patent and that said Letters Patent is hereby corrected as shown below:

<u>Title page,</u>
Item [75], Inventor, please change inventor to read:
-- Kenneth J. Tetterington --

Signed and Sealed this

Twenty-sixth Day of March, 2002

Attest:

JAMES E. ROGAN
Attesting Officer *Director of the United States Patent and Trademark Office*